United States Patent
Proctor et al.

(10) Patent No.: US 6,836,504 B2
(45) Date of Patent: Dec. 28, 2004

(54) METHOD AND APPARATUS FOR SPREADING SYMBOLS IN A COMMUNICATION SYSTEM

(75) Inventors: Lee Proctor, Cary, IL (US); William K. Morgan, Elgin, IL (US); Mark Hetherington, Crystal Lake, IL (US); Naisum Wong, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 730 days.

(21) Appl. No.: 09/783,151

(22) Filed: Feb. 14, 2001

(65) Prior Publication Data

US 2002/0186752 A1 Dec. 12, 2002

(51) Int. Cl.$^7$ ............................................. H04L 27/30
(52) U.S. Cl. ....................... 375/141; 375/146; 370/335; 370/441; 370/479
(58) Field of Search ................................. 375/150, 140, 375/141, 142, 146, 147; 370/335, 341, 441, 479

(56) References Cited

U.S. PATENT DOCUMENTS

| | | | | |
|---|---|---|---|---|
| 5,751,761 A | * | 5/1998 | Gilhousen | 375/146 |
| 6,091,760 A | * | 7/2000 | Giallorenzi et al. | 375/140 |
| 6,122,310 A | * | 9/2000 | Ziemer et al. | 375/142 |
| 6,625,136 B1 | * | 9/2003 | Niegel et al. | 370/335 |

FOREIGN PATENT DOCUMENTS

| | | |
|---|---|---|
| GB | 2343346 A | 5/2000 |
| WO | WO 99/45669 | 9/1999 |
| WO | WO 00/05831 | 2/2000 |

\* cited by examiner

*Primary Examiner*—Dac V. Ha
(74) *Attorney, Agent, or Firm*—Steven A. May

(57) ABSTRACT

A spreader (216) comprises a code generator (301) and exclusive OR circuitry (303). In the preferred embodiment of the present invention the code generator (301) generates a code having a length and value dependent upon the current transmission rate. This code is then exclusive OR'd with the incoming data stream to produce spread data.

24 Claims, 3 Drawing Sheets

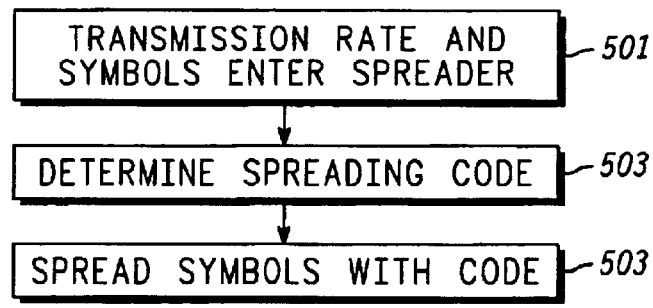
FIG. 5
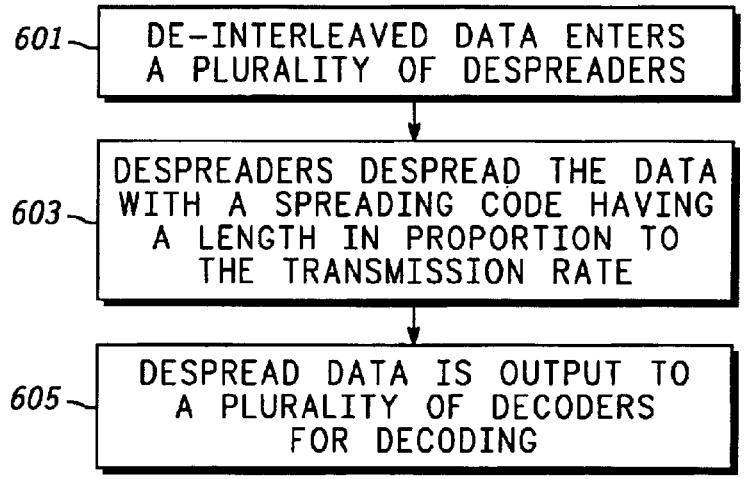
FIG. 6
FIG. 7
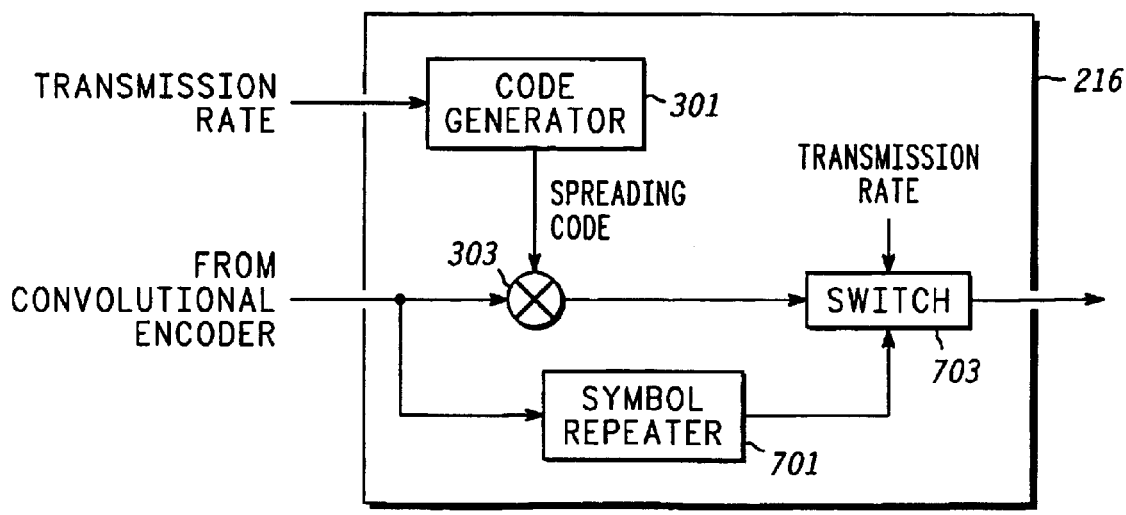

METHOD AND APPARATUS FOR SPREADING SYMBOLS IN A COMMUNICATION SYSTEM

FIELD OF THE INVENTION

The present invention relates generally to communication systems, and more particularly, to a method and apparatus for spreading symbols in a communication system.

BACKGROUND OF THE INVENTION

In current Code Division, Multiple Access (CDMA) communication systems, data to be transmitted is repeated within a frame based on a transmission rate. More particularly, voice encoded data exits a voice encoder (vocoder) at a particular transmission rate and is convolutionally encoded. As symbols exit the convolutional encoder, they are repeated a number of times, with the number being based on the current transmission rate. The result of simultaneously repeating symbols in such a way is to make the data rate over the air interface constant irrespective of the transmission rate. This is illustrated in FIG. 1. As shown, convolutional encoder 112 encodes input data bits 110 at a fixed encoding rate of one data bit to two data symbols (i.e., rate ½) such that convolutional encoder 112 outputs data symbols 114 at twice the input data rate. In this case, the input bit "0" was convolutionally encoded resulting in symbol "01". The output of encoder 112 is input into symbol repeater 116, where it is repeated a number of times based on the transmission rate (i.e., full, half, quarter, or eighth). In this particular example, the symbol was repeated once, indicating half-rate transmission.

One of the primary problems with the current transmission scheme is that the data repetition used for sub-rate transmission (particularly in the case of eighth-rate frames) results in a false determination of the transmission rate by the receiver. More particularly, because each symbol is repeated a number times, it is possible to generate very long strings of zeros. These strings of zeros are easily decodable by the full-rate decoder and have been observed to cause very low Symbol Error Rates (SERs) resulting in the frame falsely being decoded as a full-rate frame. Therefore a need exists for a method and apparatus for transmission within a communication system that reduces falsing within a communication system.

BRIEF DESCRIPTION OF THE DRAWINGS

FIG. 5 is a flow chart showing operation of the symbol spreader of FIG. 2 in accordance with the preferred embodiment of the present invention.

FIG. 6 is a flow chart showing operation of the decoder of FIG. 4 in accordance with the preferred embodiment of the present invention.

FIG. 7 is a block diagram of a symbol spreader in accordance with an alternate embodiment of the present invention.

DETAILED DESCRIPTION OF THE DRAWINGS

To address the above-mentioned need a method and apparatus for spreading symbols is provided herein. A symbol spreader comprises a code generator and exclusive OR circuitry. In the preferred embodiment of the present invention the code generator generates a code having a length and value dependent upon the current transmission rate. This code is then exclusive OR'd with the incoming data stream to produce spread data.

Because each symbol is replaced with an n-bit codeword the problems associated with the prior art are greatly reduced. More particularly, the long strings of zeros generated by prior-art symbol repeaters is greatly reduced. As a result the hamming distances are significantly increased between valid encoded sequences for one transmission rate and the valid encoded sequences for another transmission rate. This increase in the hamming distance improves the likelihood of correctly decoding the frame.

The present invention encompasses a method for spreading data. The method comprises the steps of determining a transmission rate determining a spreading code, wherein the spreading code has a length based on the transmission rate, and spreading data with the spreading code.

The present invention additionally encompasses a method for despreading data. The method comprises the steps of determining a transmission rate determining a spreading code, wherein the spreading code has a length based upon the transmission rate, and despreading data with the spreading code.

The present invention additionally encompasses an apparatus comprising a code generator outputting a spreading code, wherein the spreading code has a length dependent upon a transmission rate, and exclusive OR'ing circuitry having the spreading code and data as an input, and outputting spread data.

The present invention additionally encompasses an apparatus comprising a first despreader having data as an input and outputting the data exclusive OR'd with a first spreading code having a first value and a first length, a second despreader having the data as an input and outputting the data exclusive OR'd with a second spreading code having a second value and a second length. A first Viterbi decoder is provided having the data exclusive OR'd with the first spreading code as an input and outputting decoding metrics to a Rate determiner, and a second Viterbi decoder is provided having the data exclusive OR'd with the second spreading code as an input and outputting decoding metrics to the rate determiner.

The present invention additionally encompasses an apparatus comprising a convolutional encoder having data as an input and outputting convolutionally encoded data and a symbol spreader having the convolutionally encoded data and a transmission rate as an input and outputting spread symbols, wherein the spread symbols are spread with a spreading code dependent upon the transmission rate.

Figure 1:
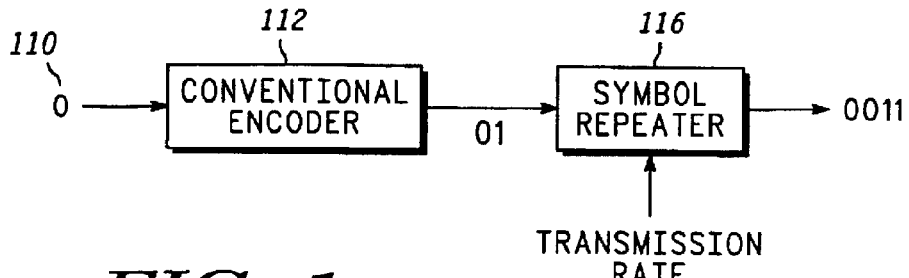
FIG. 1 illustrates prior-art symbol repetition in accordance with the preferred embodiment of the present invention.
Figure 2:
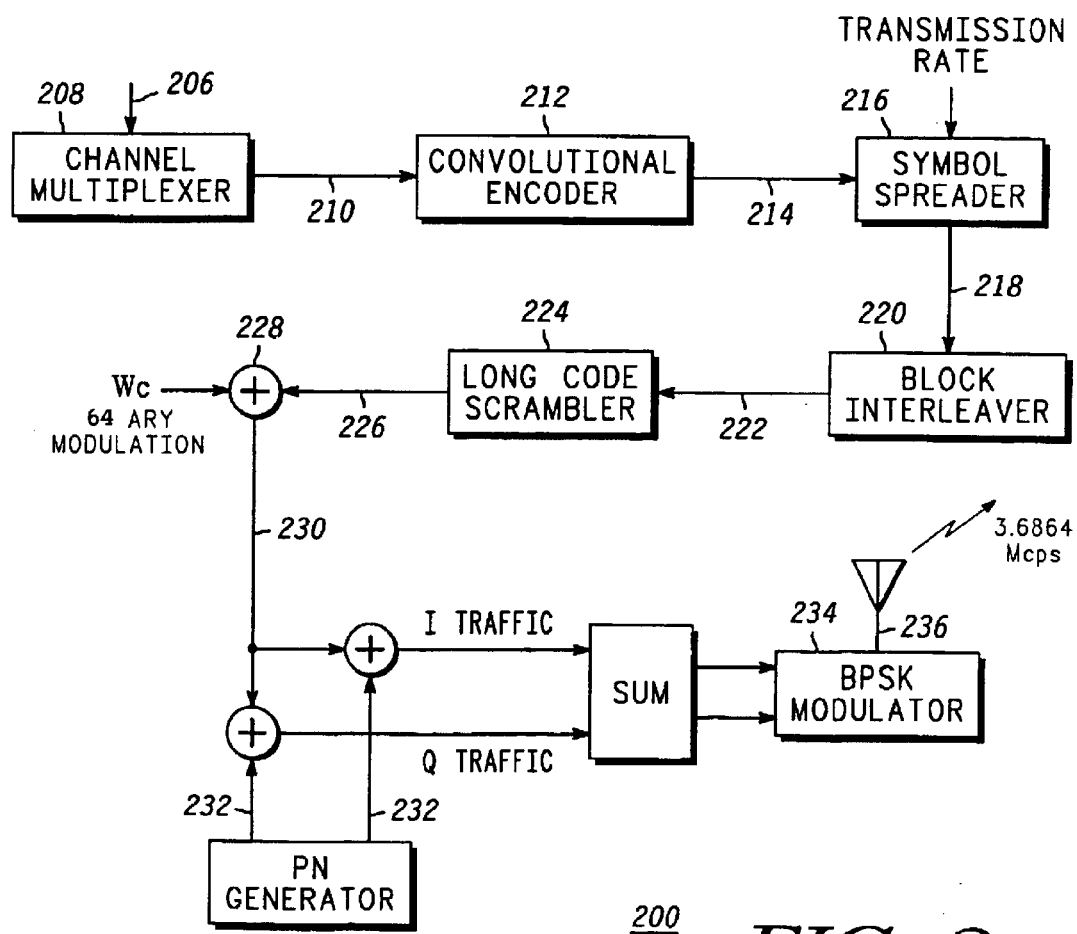
FIG. 2 is a block diagram of a base station transmitter in accordance with the preferred embodiment of the present invention.

Turning now to the drawings, wherein like numerals designate like components, FIG. 2 is a block diagram of base station transmitter 200 in accordance with the preferred embodiment of the present invention. In the preferred embodiment of the present invention, communication system 200 utilizes a direct-sequence Code Division Multiple Access (CDMA) system protocol as described in Cellular System Remote unit-Base Station Compatibility Standard of the Electronic Industry Association/Telecommunications Industry Association Interim Standard 95C (TIA/EIA/IS- 95C). However, in alternate embodiments communication system 200 may utilize other digital cellular communication system protocols such as, but not limited to, the next generation CDMA architecture as described in the UMTS Wideband CDMA SMG2 UMTS Physical Layer Expert Group Tdoc SMG2 UMTS-L1 222/98 (UMTS 222/98), the next generation CDMA architecture as described in the cdma2000 International Telecommunication Union-Radiocommunication (ITU-R) Radio Transmission Technology (RTT) Candidate Submission document, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), or the European Telecommunications Standards Institute (ETSI) Wideband CDMA (W-CDMA) protocol. The present invention is also applicable to direct-sequence spread spectrum systems which utilize code selection techniques to convey information. For example, user information may be transmitted via the particular selection of a plurality of n orthogonal waveforms from a larger plurality of N orthogonal waveforms. The present invention is applicable to both the forward and reverse transmission paths of these communication systems.

During operation, signal 206 (traffic channel data bits) is received by channel multiplexer 208 at a particular bit rate (e.g., 8.6 kbit/second). Input traffic channel data 206 bits typically include voice converted to data by a vocoder at a particular transmission rate, pure data, or a combination of the two types of data. Channel multiplexer 208 multiplexes secondary traffic (e.g., data, tail bits, . . . etc.), and/or signaling traffic (e.g. control or user messages) onto the traffic channel data 206 and outputs multiplexed data 210 at 9.6 kbit/sec to convolutional encoder 212. Convolutional encoder 212 encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 212 encodes input data bits 210 (received at a rate of 9.6 kbit/second) at a fixed encoding rate of one data bit to two data symbols (i.e., rate ½) such that convolutional encoder 212 outputs data symbols 214 at a 19.2 ksymbol/second rate.

In the preferred embodiment of the present invention symbol repeater 114 of the prior art has been replaced with a symbol spreading operation. Data symbols 214 exit encoder 212 and are input into symbol spreader 216 where the individual symbols are spread in accordance with their vocoder transmission rate (e.g., full, half, quarter, or $8^{th}$). Spread symbols 218 exit spreader 216 and enter interleaver 220. Interleaver 220 interleaves the input symbols 218 at the symbol level. In interleaver 220, data symbols 218 are individually input into a matrix which defines a predetermined size block of data symbols 218. Data symbols 218 are input into locations within the matrix so that the matrix is filled in a column by column manner. Data symbols 218 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 222 are output by interleaver 220 at the same data symbol rate that they were input (e.g., 19.2 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 19.2 ksymbol/second times 20 milliseconds which equals 384 data symbols which defines a 16 by 24 matrix.

Interleaved data symbols 222 are input to long code scrambler 224 where symbols 222 are scrambled by a long code. The scrambled symbols 226 enter orthogonal encoder 228. Orthogonal encoder 228 modulo 2 adds an orthogonal code (e.g., a 64-ary Walsh code) to each interleaved and scrambled data symbol 226. For example, in 64-ary orthogonal encoding, interleaved and scrambled data symbols 226 are each replaced by a 64 symbol orthogonal code or its inverse. These 64 orthogonal codes preferably correspond to Walsh codes from a 64 by 64 Hadamard matrix wherein a Walsh code is a single row or column of the matrix. Orthogonal encoder 228 repetitively outputs a Walsh code or its inverse which corresponds to input data symbol 26 at a fixed symbol rate (e.g., 19.2 ksymbol/second).

The sequence of Walsh codes 230 are scrambled by a pair of short pseudorandom codes 232 (i.e. short when compared to the long code) to generate an I-channel and Q-channel code spread sequence. The I-channel and Q-channel code spread sequences are used to bi-phase modulate a quadrature pair of sinusoids by driving the power level controls of the pair of sinusoids. The sinusoids output signals are summed, bandpass filtered, translated to an RF frequency, amplified, filtered via modulator 234 and radiated by an antenna 236 to complete transmission of the channel data bits 210.

Figure 3:
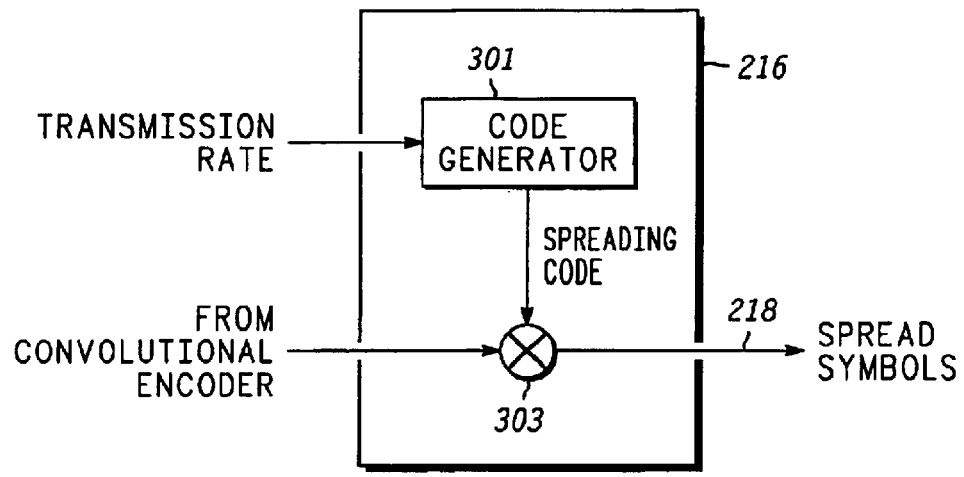
FIG. 3 is a block diagram of the symbol spreader of FIG. 3 in accordance with the preferred embodiment of the present invention.

FIG. 3 is a block diagram of the symbol repeater of FIG. 2 in accordance with the preferred embodiment of the present invention. Spreader 216 comprises code generator 301 and exclusive OR circuitry 303. In the preferred embodiment of the present invention code generator 301 generates a code having a length and value dependent upon the current vocoder transmission rate. This code is then exclusive OR'd with the incoming data stream to produce spread data.

Because each convolutional encoder bit is replaced with an n-bit codeword the problems associated with the prior art are greatly reduced. More particularly, the long strings of zeros generated by prior-art symbol repeaters is greatly reduced. This is illustrated in Tables 1 and 2.

TABLE 1

| Input to Convolutional Encoder | Output From Convolutional Encoder | Output from Prior art Repeater ($8^{th}$ Rate) |
| --- | --- | --- |
| 0 | 00 | 0000000000000000 |

TABLE 2

| Input to Convolutional Encoder | Output From Convolutional Encoder | Output from Symbol Spreader ($8^{th}$ Rate) |
| --- | --- | --- |
| 0 | 00 | 0101010101010101 |

Table 1 illustrates a "0" being input into a rate ½ convolutional encoder that generates a "00" as an output. Since prior-art symbol repeaters simply repeated the output from the convolutional encoder, the "00" is simply repeated eight times during $8^{th}$ rate transmission. As is evident, this results in long strings of zeros that can increase a receiver's falsing rate. In contrast to the long string of zeros generated by the prior art repeater, in the preferred embodiment of the present invention the output from the convolutional encoder has each bit replaced by an N-bit codeword or its inverse (where N=8 for $8^{th}$ rate, N=4 for quarter rate, N=2 for half rate, and N=1 for full rate). In this example each "0" from the convolutional encoder is exclusive OR'd with the 8 bit codeword 10101010, resulting in the "00" being replaced by the string 0101010101010101.

It should be noted that exclusive OR'ing (modulo 2 adding) a "1" or "0" with a codeword results in the codeword or its inverse, respectively. For example, "1" exclusive OR'd with 10101010 results in 10101010, while exclusive OR'ing the same codeword with a "0" results in 01010101.

Figure 4:
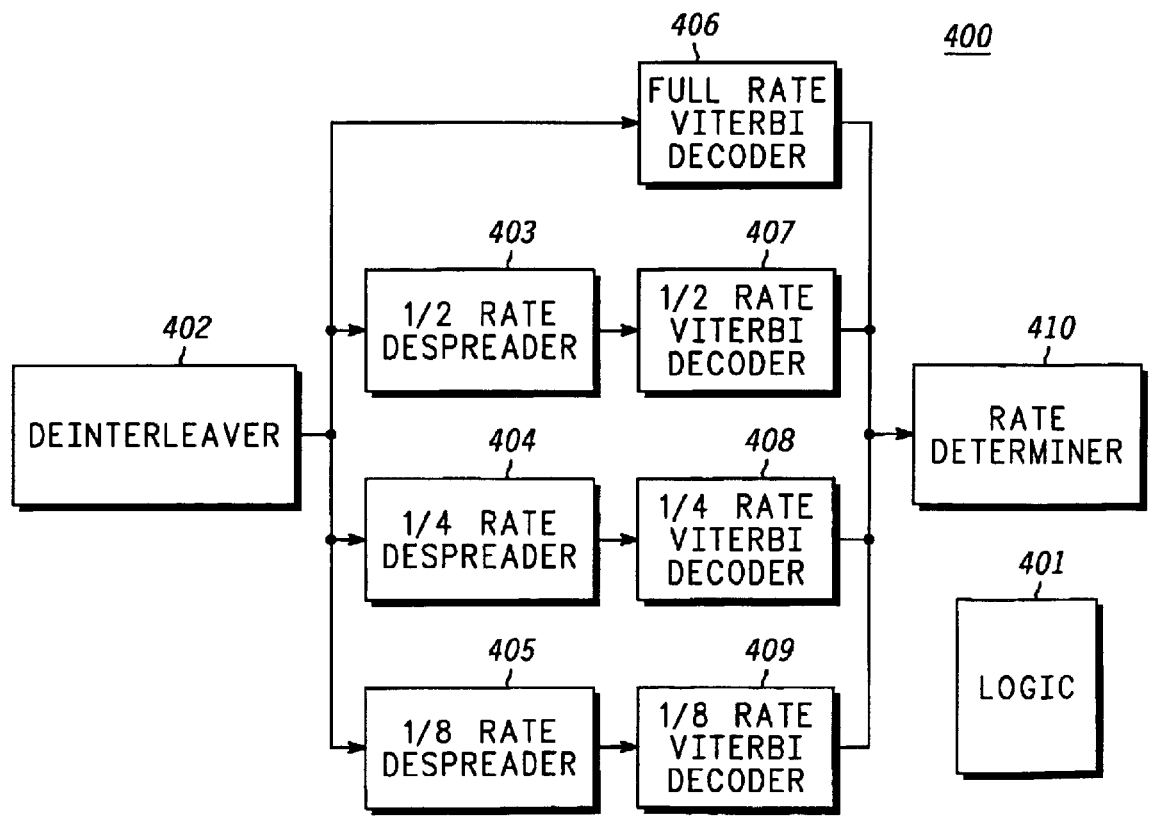
FIG. 4 is a block diagram of a decoder in accordance with the preferred embodiment of the present invention.

FIG. 4 is a block diagram of decoder 400 in accordance with the preferred embodiment of the present invention. Because the transmission rate of a transmitted signal is not known apriori, the decoder utilizes several decoders 406–409 for decoding the data and determining the appropriate transmission rate. More particularly, the decision as to what rate was employed by the transmitter is typically performed by the receiver's rate determiner 410 utilizing a Rate Determination Algorithm (RDA). Decoders 406–409 pass metrics, or decoding characteristics to determiner 410 and determiner 410 uses the decoding characteristics from each decoder 406–409 to determine what rate the received frame was transmitted at and/or whether the frame is useable. If the frame contains too many bit errors or its rate cannot be determined the frame is declared an erasure. A RDA will typically have a series of rules that it follows to determine the rate. For example some such rules could be

---

IF $CRC_{full}$ == TRUE AND $SER_{full}$ <= $SER_{fullthreshold}$
    THEN FRAME_RATE = FULL
IF $CRC_{full}$ == FALSE AND $SER_{full}$ > $SER_{fullthreshold}$
    AND $CRC_{half}$ == FALSE AND $SER_{half}$ > $SER_{halfthreshold}$
    AND $SER_{eighth}$ < $SER_{eighththreshold}$
    THEN FRAME_RATE = EIGHTH

---

Where
$CRC_x$ is the Cyclic Redundancy Check result for a particular rate;
$SER_x$ is Symbol Error Rate for a particular rate; and
$SER_{xthreshold}$ is an $SER_x$ comparison threshold.

In decoding the data for various vocoder transmission rates, decoder 400 must first perform symbol despreading prior to Viterbi decoding. Thus, in accordance with the preferred embodiment of the present invention, de-interleaved data is passed to three despreaders 403–405. Despreaders 403–405 utilize a codeword for despreading that has a length N based upon the current transmission rate. As described above, N=8 for $8^{th}$ rate, 4 for ¼ rate, and 2 for ½ rate. As one skilled in the art will recognize, the codeword used in despreading must be identical to the codeword used in the spreading operation. By exclusive OR'ing the appropriate codeword (spreading code) with the received data, an exact replica of the transmitted data is obtained.

FIG. 5 is a flow chart showing operation of the symbol spreader of FIG. 3 in accordance with the preferred embodiment of the present invention. The logic flow begins at step 501 where a transmission rate, and symbols enter spreader 216. Code generator analyzes the transmission rate and determines a particular spreading code for spreading the symbols (step 503). As described above, in the preferred embodiment of the present invention the particular spreading code has a length based on a transmission rate is chosen. In the preferred embodiment of the present invention the code words are completely independent. In other words, in addition to the length of each codeword varying based on the transmission rate, but the actual string of 1's and 0's are varied as well. For example, in the preferred embodiment of the present invention a half rate codeword is 01 while the quarter rate code and eighth rate codes are 1010 and 11001100, respectively. Finally, at step 505 each bit output from the convolutional encoder is spread with the spreading code.

As discussed above, because each convolutional encoder bit is replaced with an n-bit codeword the problems associated with the prior art are greatly reduced. More particularly, the long strings of zeros generated by prior-art symbol repeaters is greatly reduced. As a result the hamming distances are significantly increased between valid encoded sequences for one transmission rate and the valid encoded sequences for another transmission rate. This increase in the hamming distance improves the likely hood of correctly decoding the frame.

FIG. 6 is a flow chart showing operation of the decoder of FIG. 4 in accordance with the preferred embodiment of the present invention. The logic flow begins at step 601 where de-interleaved data enters a plurality of despreaders (e.g., ½ rate, ¼ rate, and ⅛ rate despreaders). At step 603 despreaders despread the data with a spreading code having a length and value based on the transmission rate. Finally, at step 605 the despread data is output to a plurality of decoders for decoding.

While the invention has been particularly shown and described with reference to a particular embodiment, it will be understood by those skilled in the art that various changes in form and details may be made therein without departing from the spirit and scope of the invention. For example, in an alternate embodiment of the present invention symbol spreading is only done for a particular transmission rate (e.g., $8^{th}$ rate transmission). In this case, symbols for all other transmission rates (e.g., full, half, quarter) exiting encoder will simply be repeated as in the prior art. Such a spreader is shown in FIG. 7. As shown, spreader 216 comprises a prior-art symbol repeater 710 and switch 703. Symbol spreading is accomplished as described above, and symbol repeating is accomplished as in the prior art. Switch 703 serves to pass either prior art repeated symbols or spread symbols, depending upon the current transmission rate. In the alternate embodiment spreading is only done for $8^{th}$ rate transmission, all other rates are simply repeated as described in the prior art. It is intended that such changes come within the scope of the following claims.

What is claimed is:

1. A method for encoding user data in a transmitter, the method comprising the steps of:
   receiving input data at a transmission rate of a plurality of pre-determined transmission rates;
   determining the transmission rate of the received input data from among the plurality of pre-determined transmission rates;
   determining a spreading code, wherein the spreading code has a length and value associated with the transmission rate and wherein the value is uncorrelated with values of spreading codes associated with other transmission rates and is not user dependent; and
   spreading data with the spreading code to form a transmission rate dependent spread sequence.

2. The method of claim 1 wherein the step of spreading data with the spreading code comprises the step of modulating the input data with a one-bit codeword when the spreading code is associated with a full transmission rate.

3. The method of claim 1 wherein the step of determining the transmission rate comprises the step of determining the transmission rate when the transmission rate is taken from the group consisting of at least an eighth, half, and full transmission rate.

4. The method of claim 1 wherein the step of spreading data with the spreading code comprises the step of exclusive OR'ing the input data with the spreading code to form a transmission rate dependent spread sequence.

5. The method of claim 1 wherein the step of determining the transmission rate comprises the step of determining a voice coder (vocoder) transmission rate.

6. The method of claim 1, wherein receiving input data comprises receiving input data at a voice transmission rate from a group of full rate, half rate, eighth rate, wherein determining the transmission rate comprises determining whether the voice transmission rate is an eighth rate, and wherein determining a spreading code comprises, when the voice transmission rate is an eighth rate, determining an eight bit spreading code comprising an eight bit non-zero codeword.

7. A method for decoding data, the method comprising the steps of:
receiving input data;
determining a plurality of spreading codes, wherein each spreading code of the plurality of spreading codes has a length and value associated with a respective transmission rate of a plurality of potential transmission rates, wherein the value of each spreading codes of the plurality of spreading codes is uncorrelated with a value of other spreading codes of the plurality of spreading codes that are associated with other transmission rates of the plurality of potential transmission rates, and wherein each spreading code of the plurality of spreading codes is not user dependent;
despreading the input data with each spreading code of the plurality of spreading codes to form a plurality of despread data sequences;
decoding each despread data sequence of the plurality of despread data sequences with a respective decoder associated with the same transmission rate as the spreading code used to despread the data to form a plurality of output data sequences; and
determining a transmission rate of the received data base on the plurality of output data sequences.

8. The method of claim 7 wherein the step of despreading the input data with each spreading code comprises the step of demodulating the input data with a one-bit code when the spreading code is associated with a full transmission rate.

9. The method of claim 7 wherein the step of determining a plurality of spreading codes comprises the steps of determining a first spreading code that has a length and value associated with a half rate transmission and determining a second spreading code that has a length an value associated with an eighth rate transmission rate.

10. The method of claim 7 wherein the step of despreading the input data comprises the step of exclusive OR'ing the input data with each spreading code of the plurality of spreading codes to form a plurality of despread data sequences.

11. The method of claim 7 wherein the step of determining a transmission rate comprises the step of determining a voce coder (vocoder) transmission rate.

12. An apparatus comprising:
means for receiving input data at a transmission rate of a plurality of pre-determined transmission rates;
means for determining the transmission rate of the received input data from among the plurality of pre-determined transmission rates;
a code generator outputting a spreading code, wherein the spreading code has a length and value associated with the transmission rate and wherein the value is uncorrelated with values of spreading codes associated with other transmission rates and is not user dependent; and
exclusive OR'ing circuitry having the spreading code and data as an input, and outputting spread data spread by the spreading code to form a transmission rate dependant spread sequence.

13. The apparatus of claim 12 wherein the transmission rate is taken from the group consisting of eight rate, half rate, and full rate transmission.

14. The apparatus of claim 12 wherein the transmission rate is a voice coder (vocoder) transmission rate.

15. An apparatus for decoding received data comprising:
a rate determiner;
a first despreader having the data as an input and outputting the data exclusive OR'd with a first spreading code having a first value and a first length;
a second despreader having the data as an input and outputting the data exclusive OR'd with a second, different spreading code having a second value and a second length;
a first Viterbi decoder having the data exclusive OR'd with the first spreading code as an input and outputting decoding metrics to the rate determiner;
a second Viterbi decoder having the data exclusive OR'd with the second spreading code as an input and outputting decoding metrics to the rate determiner; and
wherein the rate determiner determines a transmission rate of the data based on the decoding metrics output by the first Viterbi decoder and second Viterbi decoder.

16. The apparatus of claim 15 wherein the first despreader is a ½ rate despreader.

17. The apparatus of claim 16 wherein the second despreader is a ¼ rate despreader.

18. The apparatus of claim 17 wherein the first Viterbi decoder is a ½ rate Viterbi decoder.

19. The apparatus of claim 15 wherein the second Viterbi decoder is a ¼ rate Viterbi decoder.

20. The apparatus of claim 15 wherein the rate determiner is a voice encoder (vocoder) rate determiner.

21. An apparatus comprising:
a convolutional encoder having data as an input and outputting convolutionally encoded data; and
a symbol spreader having the convolutionally encoded data and a transmission rate as an input and outputting spread symbols, wherein the spread symbols are spread with a spreading code that has a length and value associated with the transmission rate and wherein the value is uncorrelated with values of spreading codes associated with other transmission rates and is user dependent.

22. The apparatus of claim 21 further comprising:
a block interleaver having the spread symbols as an input and outputting interleaved spread symbols.

23. The apparatus of claim 21 wherein the transmission rate is taken from the group consisting of full, half, quarter and eighth rate transmission.

24. The apparatus of claim 21 wherein the transmission rate is a voice coder (vocoder) transmission rate.

* * * * *

UNITED STATES PATENT AND TRADEMARK OFFICE
CERTIFICATE OF CORRECTION

PATENT NO. : 6,836,504 B2
DATED : December 28, 2004
INVENTOR(S) : Proctor et al.

It is certified that error appears in the above-identified patent and that said Letters Patent is hereby corrected as shown below:

Column 7,
Line 56, after "transmission" delete "rate."

Signed and Sealed this

Third Day of May, 2005

JON W. DUDAS
*Director of the United States Patent and Trademark Office*